(12) United States Patent
Grossman

(10) Patent No.: US 7,939,582 B2
(45) Date of Patent: *May 10, 2011

(54) COMPOSTABLE VINYL ACETATE POLYMER COMPOSITIONS, COMPOSITES AND LANDFILL BIODEGRADATION

(75) Inventor: Richard F. Grossman, Wilmington, DE (US)

(73) Assignee: Biotech Products, LLC, Randolph, NJ (US)

( * ) Notice: Subject to any disclaimer, the term of this patent is extended or adjusted under 35 U.S.C. 154(b) by 554 days.

This patent is subject to a terminal disclaimer.

(21) Appl. No.: 12/049,668

(22) Filed: Mar. 17, 2008

(65) Prior Publication Data

US 2008/0166789 A1 Jul. 10, 2008

Related U.S. Application Data

(63) Continuation-in-part of application No. 11/747,481, filed on May 11, 2007, which is a continuation-in-part of application No. 11/041,322, filed on Jan. 24, 2005, now Pat. No. 7,390,841.

(51) Int. Cl.
| | |
|---|---|
| B29C 33/60 | (2006.01) |
| B32B 3/00 | (2006.01) |
| B32B 3/10 | (2006.01) |
| B32B 5/00 | (2006.01) |
| B32B 7/00 | (2006.01) |
| B32B 9/04 | (2006.01) |
| B32B 27/02 | (2006.01) |
| B32B 27/30 | (2006.01) |
| B60K 15/04 | (2006.01) |
| C07F 7/00 | (2006.01) |
| C08G 18/77 | (2006.01) |
| C08G 18/28 | (2006.01) |
| C08J 3/00 | (2006.01) |
| C08K 5/00 | (2006.01) |
| C08K 5/49 | (2006.01) |
| C08K 5/51 | (2006.01) |
| C08K 5/56 | (2006.01) |
| C08L 31/02 | (2006.01) |
| C04B 24/26 | (2006.01) |
| D06N 7/00 | (2006.01) |
| D06P 1/52 | (2006.01) |

(52) U.S. Cl. .......... 523/124; 428/98; 428/137; 428/147; 428/190; 442/155; 442/164; 523/126; 524/115; 524/136; 524/176; 524/210; 524/218; 524/225; 524/563

(58) Field of Classification Search .................. 523/124, 523/126; 525/176, 115, 136, 210, 218, 225, 525/563; 428/98, 137, 147, 190; 442/155, 442/164; 524/176, 115, 136, 210, 218, 225, 524/563

See application file for complete search history.

(56) References Cited

U.S. PATENT DOCUMENTS

| | | |
|---|---|---|
| 2,641,588 A | 6/1953 | Leistner et al. |
| 2,641,596 A | 6/1953 | Leistner et al. |
| 2,648,650 A | 8/1953 | Weinberg et al. |
| 2,726,227 A | 12/1955 | Leistner et al. |
| 2,726,254 A | 12/1955 | Leistner et al. |
| 2,801,258 A | 7/1957 | Johnson |
| 2,870,119 A | 1/1959 | Leistner et al. |
| 2,870,182 A | 1/1959 | Leistner et al. |
| 2,872,468 A | 2/1959 | Leistner et al. |
| 2,883,363 A | 4/1959 | Leistner et al. |
| 2,891,922 A | 6/1959 | Johnson |
| 2,914,506 A | 11/1959 | Mack et al. |
| 2,954,363 A | 9/1960 | Kuehne et al. |
| 3,021,302 A | 2/1962 | Frey et al. |
| 3,413,264 A | 11/1968 | Hechenbleiker et al. |
| 3,424,712 A | 1/1969 | Gottlieb et al. |
| 3,424,717 A | 1/1969 | Gottlieb et al. |
| 4,069,192 A | 1/1978 | Monte et al. |
| 4,080,353 A | 3/1978 | Monte et al. |
| 4,087,402 A | 5/1978 | Monte et al. |
| 4,094,853 A | 6/1978 | Monte et al. |
| 4,096,110 A | 6/1978 | Monte et al. |
| 4,098,758 A | 7/1978 | Monte et al. |
| 4,101,810 A | 7/1978 | Schermerhorn et al. |
| 4,122,062 A | 10/1978 | Monte et al. |
| 4,152,311 A | 5/1979 | Monte et al. |
| 4,192,792 A | 3/1980 | Sugerman et al. |
| 4,261,913 A | 4/1981 | Monte et al. |
| 4,277,415 A | 7/1981 | Sugerman et al. |
| 4,338,220 A | 7/1982 | Sugerman et al. |
| 4,417,009 A | 11/1983 | Sugerman et al. |
| 5,514,734 A | 5/1996 | Maxfield et al. |
| 2003/0196960 A1 | 10/2003 | Hughes |

FOREIGN PATENT DOCUMENTS

| | | |
|---|---|---|
| DE | 10157420 A1 | 6/2003 |
| EP | 1127914 A | 8/2001 |
| GB | A-1 423 657 | 2/1976 |
| GB | A-1 488 620 | 10/1977 |
| WO | WO 00/17270 A | 3/2000 |
| WO | WO 02070104 A | 9/2002 |
| WO | WO 2004/032988 A | 4/2004 |

(Continued)

OTHER PUBLICATIONS

English Abstract of DE 10157420, Naday et al., Jun. 2003.*
A.V. Yabannavar et al., Methods for Assessment of Biodegradability of Plastic Films in Soil, Applied and Environmental Microbiology, vol. 60, No. 9, Oct. 1994, p. 3608-3614.
T. M. Phillips et al., Biodegradation of Hexachlorocyclohexane (HCH) by Microorganisms, Biodegradation 16: 363-392 (2005).

(Continued)

*Primary Examiner* — Patrick D Niland
(74) *Attorney, Agent, or Firm* — Wood Herron & Evans LLP

(57) ABSTRACT

Compositions of vinyl acetate polymers such as polyvinyl acetate (PVAc) are rendered compostable by a monomeric adduct of an organotitanate or zirconate as a prodegradant. PVAc sheets and composites are compostable in landfills.

17 Claims, No Drawings

OTHER PUBLICATIONS

Y. Otake et al., Biodegradation of Low-Density Polyethylene, Polyvinyl Chloride, and Urea Formaldehyde Resin Buried Under Soil for Over 32 Years. J. Applied Polymer Science, vol. 56, 1789-1796 (1995).

I. Mersiowsky, Fate of PVC Polymer, Plasticizers, and Stabilizers in Landfilled Waste, J. Vinyl & Additive Technology, vol. 8, No. 1, Mar. 2002.

Leonard I. Nass and Charles A. Heiberger, Encyclopedia of PVC, vol. 2, p. 47, Marcel Dekker, Inc., New York.

Ha, K R et al, "Polycarpolactone Polyvinyl Chloride Polymer Mixture Biodegradable Film Sheet", Abstract Only, Database WPI Section Ch. Week 200348 Derwent Publications Ltd., London, GB; AN2003-511077XP002353301 and KR 2003 019 726 A (Ha K R) Mar. 7, 2003.

\* cited by examiner

COMPOSTABLE VINYL ACETATE POLYMER COMPOSITIONS, COMPOSITES AND LANDFILL BIODEGRADATION

RELATED APPLICATION

This application is a continuation-in-part application of U.S. patent application Ser. No. 11/747,481, filed May 11, 2007, entitled "Compostable Vinyl Halide Polymer Compositions, Composites and Landfill Biodegradation", which in turn is a continuation-in-part of U.S. patent application Ser. No. 11/041,322, filed Jan. 24, 2005, entitled "Compostable Vinyl Halide Polymer Compositions and Composite Sheets", and the entire description and claims of these applications are incorporated herein by reference.

FIELD OF THE INVENTION

This invention relates to compostable or biodegradable vinyl acetate polymer compositions, for example, polyvinyl acetate (PVAc) and composite sheets of such polymers. Articles of vinyl acetate polymers anaerobically biodegrade in landfills in a relatively short time.

BACKGROUND OF THE INVENTION

For many years it has been desired to make plastic materials from polymers such as polyvinyl chloride (PVC) and polyvinyl acetate (PVAc), which are either biodegradable by microorganisms or environmentally degradable such as in a landfill. In spite of considerable efforts, landfills are becoming inundated with plastic materials, and articles made therefrom, that will not degrade perhaps for centuries. This is especially true for vinyl halide polymer materials such as PVC that are considered non-biodegradable, that is, they persist in landfills under anaerobic conditions indefinitely without noticeable decomposition. This factor limits the acceptance of PVC in many products where its useful balance of properties and low cost would be attractive. An example is that of printable film and sheet. If a sample of flexible (plasticized) PVC is tested per ASTM D 5526, Standard Test Method for Determining Anaerobic Biodegradation of Plastic Materials Under Accelerated Landfill Conditions, there is no appreciable weight loss or change in appearance after 100 days at 97° F. in contact with simulated household waste. In contrast, cellulosic polymers and other biodegradable plastics, such as polylactic acid and polycaprolactone, are completely consumed.

There has been a particular need for a compostable polymer composition for use in many end products such as polyvinyl chloride or polyvinyl acetate films, banners, billboards, signs, laminates, ink jet media, diapers, hygienic pads and the like. These products must satisfy properties for practical purposes such as tear strength, tensile and impact strengths to function in many useful articles. However, the same properties that make them useful lead to their lack of biodegradability. PVC, PVAc and other vinyl polymers have achieved widespread usage. However, the explosive growth of such thermoplastics has aggravated the problem of disposing of them, and has caused their accumulation in landfills. Very little of these polymeric waste products degrade in most landfills because of anaerobic conditions. The problem has become aggravated because of the shortage of landfills and municipalities are seeking to restrict the use of plastics because of their inability to degrade in landfills.

SUMMARY OF THE INVENTION

This invention is directed to a compostable vinyl acetate polymer composition. In particular, polyvinyl acetate (PVAc) compositions have been rendered compostable by formulation with a prodegradant of an organotitanate or zirconate compound. Moreover, this invention is directed to a method of anaerobic biodegradation of vinyl acetate polymer articles in a landfill.

As reported in the above-identified Ser. No. 11/041,322 patent application, polyvinyl chloride compositions have been formulated with plasticizer and stabilizer along with the prodegradant composition. Polymeric sheets containing this composition and composites with woven or nonwoven sheets have been made compostable. Such compositions consist of (a) PVC; (b) a plasticizer selected from the group of completely aliphatic carboxylic acid esters; (c) a heat stabilizer selected from the group of sulfur-free dialkyl and monoalkyltin carboxylates; and (d) a reactive organotitanate or organozirconate. As reported in the above-identified Ser. No. 11/747,481 patent application, further unobvious and unexpected improvements have been made. In particular, compositions of vinyl halide resins such as PVC, even without plasticizer, are compostable when the prodegradant system is employed. In addition, it has also been found that the reactive organotitanate or organozirconate can be broadened to include other monomeric adducts in addition to the amide adduct disclosed in the above-identified Ser. No. 11/041,322 patent application. For instance, an ester adduct of the organotitanate or organozirconate and an organotin compound, in relative amounts, has been found to render the vinyl halide polymer composition compostable, even in the absence of a plasticizer.

This application is directed to compostable vinyl acetate polymer compositions comprising a vinyl acetate polymer and a monomeric adduct of an organotitanate, or organozirconate, as a prodegradant in relative amounts to render the vinyl acetate polymer composition compostable. As employed herein, the term "adduct" is intended to mean a complex association of the monomeric molecule and the organotitanate or organozirconate molecule. It was previously reported that amide salts of the neoalkoxy modified monoalcoxy titanate or zirconate achieved the objectives of the invention. The amide salts were defined particularly by methacrylamide as the monomeric adduct of the reactive titanate or zirconate. It has also been found that the ester adducts of the specific organotitanates or zirconates can also function in the prodegradant of this invention. The monomeric ester of the organotitanate or organozirconate adduct is exemplified by dimethylaminoethyl methacrylate. It has also been found that the dimethylaminopropyl acrylamide is found to be as effective as the methacrylamide.

The compositions and composites of this invention, as well as useful articles made therefrom, are compostable. Useful articles include sheets of the compostable vinyl acetate polymer composition, and a compostable woven or nonwoven fabric of a polymer selected from the group consisting of polyvinyl alcohol, polyacrylamide, polyacrylate, polymethacrylate, and polyester. "Compostable" means that the composition or sheet undergoes chemical, physical, thermal and/or biological degradation such that it may be incorporated into and is physically indistinguishable from finished compost (humus) and which ultimately mineralizes (biodegrades) to $CO_2$, water and biomass in the environment like other known compostable matter such as paper and yard waste. The compostable films and composites are either biodegradable or environmentally degradable. "Biodegradable" means that the composition or composite is susceptible to being assimilated by microorganisms when buried in the ground or otherwise contacted with the organisms under conditions conducive to their growth. "Environmentally degradable" means that the film or layer is capable of being degraded by heat or surrounding environmental elements without microorganisms to a form that ultimately may be biodegradable when it mineralizes, for example, biodegrades to carbon dioxide, water and biomass. For purposes of this invention, "compostable" is intended to include "biodegradable" or "environmentally degradable".

Composting conditions that enable the chemical, physical, thermal and/or biological degradation of the composition or composite may vary. The compositions or composites of this invention are especially adapted to be compostable in municipal solid waste composting facilities or landfills. For example, following ASTM D 5526-94 (reapproved 2002), Standard Test Method for Determining Anaerobic Biodegradation of Plastic Materials Under Accelerated Landfill Conditions, samples of PVC were degraded, incorporated into and physically indistinguishable in the test landfill.

Compostable vinyl acetate polymer compositions and composites of this invention, their method of manufacture and compostability will be understood with reference to the following detailed description.

DETAILED DESCRIPTION OF THE INVENTION

A. Vinyl Acetate Polymer

The vinyl acetate polymer employed is most commonly a homopolymer of vinyl acetate, i.e., polyvinyl acetate. Copolymers of vinyl acetate are also suitably employed. It is to be understood, however, that this invention is not limited to polyvinyl acetate or its copolymers. Other vinyl acetate based polymers which are employed and which illustrate the principles of this invention include partially hydrolyzed polyvinyl acetate, e.g. polyvinyl alcohol, ethylene-vinyl acetate, vinyl chloride-vinyl acetate copolymer or other copolymer types. Vinyl acetate based polymer, as understood herein, and as appreciated in the art, is a common term and is adopted to define those polymers usually derived by polymerization or copolymerization of vinyl acetate monomer with or without other comonomers such as ethylene, propylene, vinyl chloride, vinyl ethers, vinylidene chloride, methacrylate, acrylates, styrene, etc. A simple case is the conversion of vinyl acetate to polyvinyl acetate wherein the ether oxygen of the ester group is bonded to the carbon atoms of the carbon chain of the polymer.

B. Prodegradant Organotitanate or Organozirconate Monomeric Adducts

The prodegradant of this invention is a monomeric adduct of an organozirconate or organotitanate. The monomeric adducts are exemplified by the monomeric groups of dimethylaminopropyl acrylamide, methacrylamide, dimethylaminoethyl methacrylate, and other similar reactive monomeric groups as detailed herein. In a broader sense, the adducts more preferably comprise dialkylamino-short alkyl-chain-reactive monomers. The prodegradant may be defined more particularly as follows.

The chemical description and chemical structure of organotitanates or zirconates has been well developed. For instance, Kenrich LICA 38J is a reactive titanate under the chemical name titanium IV neoalkanolato, tri(dioctyl) pyrophosphate-O (adduct) N-substituted methacrylamide. Furthermore, with zirconium substituted for titanium, Kenrich produces NZ 38 under the chemical description zirconium IV neoalkanolato, tri(dioctyl) pyrophosphate-O (adduct) N-substituted methacrylamide. These compounds are generally referred to as amide salts of neoalkoxy modified monoalkoxy titanate or zirconate. While the invention has been exemplified with these amide adducts of these specific organotitanates or organozirconates, it is to be understood that other similar compounds can achieve the objectives of this invention.

The K38J pyrophosphato titanium adduct is the reaction product of K38+dimethylaminopropyl methacrylamide (DMPDMA), according to the following structure where R'=methyl, R"=propyl, R=butyl, n~3.

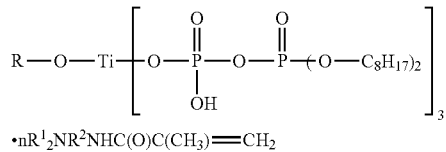

•nR$^1_2$NR$^2$NHC(O)C(CH$_3$)=CH$_2$

K38=the above structure without DMPDMA. These two ingredients react rapidly at room temperature when mixed in stoichiometric proportions (close to 3:1). P—OH becomes P—O⁻ and R$_2$N, R$_3$N+. A bright red color develops, which is the thermochromic, indicating coordination of likely C=O to titanium, which displays such colors when penta-coordinate instead of tetra-coordinate. (For example, acetone•TiCl4 is orange-red, and the precursors, colorless.) Neither K38 nor DMPDMA cause depolymerization of vinyl acetate polymers when used alone. However, if added separately to the PVAc compound, the combination in situ is as effective as K38J. Thus, use of the term "adduct" is intended to cover the use of preformed complex or the separate addition of the components to enable their association or complexing in situ to provide the prodegradant effects of this invention.

A substituted methacrylamide can also be employed as an adduct of the organotitanate or zirconate. For instance, Kenrich Ken-React KR-238J is another reactive titanate where the monomeric adduct is a substituted methacrylamide. The KR-238J is a dimethylaminopropyl acrylamide which has been found to be as effective as the methacrylamide adduct of Kenrich-38J, described above. A chemical description of KR-238J is di(dioctyl)pyrophosphato ethylene titanate (adduct) N-substituted methacrylamide. Furthermore, dimethylaminoethyl methacrylate, a monomeric ester adduct, is equally effective in combination with the pyrophosphato form of the titanium or zirconium coupling agent. The K238J adduct has the chemical structure as follows:

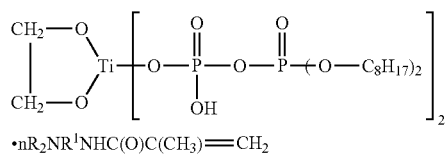

•nR$_2$NR$^1$NHC(O)C(CH$_3$)=CH$_2$

K238=the above structure without DMPDMA. Thus, as used herein "K38 and "K238" are intended to mean the organopyrophosphato titanate portion of the adduct which is complexed with the monomeric amide, ester, or other like monomers. Specific compounds are exemplified by titanium IV neoalkanolato tri(dioctyl) pyrophosphato-O (adduct) N-substituted methacryloamide and zirconium IV neoalkanolato tri(dioctyl) pyrophosphato-O (adduct) N-substituted methacrylamide, titanium IV bis(dioctyl) pyrophosphato-O (adduct) N,N-dimethylamino-alkyl propenamide, and zirconium IV bis(dioctyl) pyrophosphato-O (adduct) N,N-dimethylamino-alkyl propenamide.

The above monomeric adducts result from salt formation via the titanate/zirconate acidic —P=O(OH) group. The monomer contains a basic functional group that will react to form a salt (but not go on to other reactions such as oxidation). A tertiary amine group is favorable. This could be a dialkyl amine group, methyl pyridine functionality or a range of basic nitrogen heterocyclic groups. The rest of the reactive monomer must contain an activated carbon-carbon double bond. The C=C bond, to be activated, should be conjugated with C=O, as in an ester, ketone, aldehyde or amide, with —CN, with oxygen as in a vinyl ether, or with oxygen, nitrogen or sulfur in an allylic linkage, or with an aromatic ring as in styrene or vinyl ferrocene.

In a more generalized form, the adducts can be defined as:

organotitanate or zirconate —P=O(OH) salt-forming group-R—C=C-activating group, where R is a hydrocarbon radical or substituted hydrocarbon radical and the activating group is conjugated with the C=C.

Other monomers of the adducts of this invention are exemplified by the following:

ethyl dimethylaminoethylmethacrylate $(CH_3)_2N—CH_2—CH_2—CH=C—C=O$
       $\phantom{(CH_3)_2N—CH_2—CH_2—CH=}CH_3\phantom{—C}O—CH_2CH_3$ methyl dimethylaminopropyl acrylate $(CH_3)_2N—CH_2—CH_2—CH_2—CH=CH—C=O$
       $\phantom{(CH_3)_2N—CH_2—CH_2—CH_2—CH=CH—C=}OCH_3$ 2-morpholine-N-ethyl acrylamide $\begin{array}{c}CH_2CH_2\\O\phantom{xx}N—CH_2CH_2—CH=CH—C=O\\CH_2CH_2\phantom{xxxxxxxxxxxxxxxxxx}NH_2\end{array}$ 2-piperidinyl-N-ethyl acrylonitrile $\begin{array}{c}CH_2CH_2\\O\phantom{xx}N—CH_2CH_2—CH=CH—CN\\CH_2CH_2\end{array}$ 2-dimethylaminoethyl acrolein $(CH_3)_2N—CH_2CH_2—CH=CH—CH=O$ dimethylaminoethyl vinyl ether $(CH_3)_2N—CH_2CH_2—O—CH=CH_2$ dimethylaminoethyl vinyl thioether 4-dimethylaminomethyl styrene $(CH_3)_2N—CH_2—ARYL—CH=CH_2$ allyl 3-dimethylamino propionate $(CH_3)_2N—C_2H_4—C\begin{smallmatrix}O\\\parallel\\\phantom{x}\end{smallmatrix}$
$\phantom{(CH_3)_2N—C_2H_4—C}O—CH_2—C=CH_2$ methallyl 3-dimethylamino propionate $(CH_3)_2N—C_2H_4—C\begin{smallmatrix}O\\\parallel\\\phantom{x}\end{smallmatrix}$
$\phantom{(CH_3)_2N—C_2H_4—C}O—CH_2—C=CH_2$
$\phantom{(CH_3)_2N—C_2H_4—CO—CH_2—}CH_3$ thioallyl 3-dimethylamino propionate $(CH_3)_2N—C_2H_4—C\begin{smallmatrix}O\\\parallel\\\phantom{x}\end{smallmatrix}$
$\phantom{(CH_3)_2N—C_2H_4—C}S—CH_2—CH=CH_2$ dimethylaminomethyl acrylate (reverse ester), also corresponding reverse amides $CH_2=CH—C=O$
$\phantom{CH_2=CH—C=}O—CH_2—N(CH_3)_2$ dimethylaminomethylacrylamide $CH2=CH—C\begin{smallmatrix}O\\\parallel\\\phantom{x}\end{smallmatrix}$
$\phantom{CH2=CH—C}N—CH_2—N(CH_3)_2$
$\phantom{CH2=CH—C}CH_3$ These organotitanates or zirconates are further described in considerable detail in the following US Patents which are incorporated herein in their entireties by reference, namely, U.S. Pat. Nos. 4,069,192; 4,080,353; 4,087,402; 4,094,853; 4,096,110; 4,098,758; 4,122,062; 4,152,311; 4,192,792; 4,101,810; 4,261,913; 4,277,415; 4,338,220; 4,417,009.

C. Organotin Compounds

When copolymers of vinyl acetate and vinyl chloride are used, mono- and diorganotin compounds are employed as well known stabilizers for PVC in the copolymer. In other words, the prodegredant acts systematically with the organotin as reported in the earlier patent application Ser. No. 11/747,481, above identified. The generalized organotin stabilizer formula is $R_2SnX_2$ or $R_2SnX_3$. The R-group used in the above general formula of tin stabilizers can be lower alkyl such as butyl. More recently, because of availability and relatively low cost, fatty acid carboxylates have been employed. Cost-effective methods have been developed to produce tin intermediates, which were then reacted with carboxylic acids or with ligands containing mercaptan groups to yield stabilizers for vinyl acetate resins. Accordingly, among the class of organotin compounds suitable for use in accordance with this invention are organotin carboxylates or organotin sulfur-containing compounds are U.S. Pat. Nos. 2,641, 588; 2,648,650, 2,726,227; 2,726,254; 2,801,258; 2,870,119; 2,891,922; 2,914,506 and 2,954,363; the organotin mercaptoacid esters as described in U.S. Pat. No. 2,641,596; organotin esters of mercapto alcohols of U.S. Pat. Nos. 2,870,119; 2,870,182; 2,872,468 and 2,883,363; and organo thiostannoic acids such as butyl thiostannoic acid as disclosed in U.S. Pat. Nos. 3,021,302; 3,413,264; 3,424,712 and 3,424,717. All of these patents are incorporated herein in their entireties by reference. Organotin carboxylates, such as dibutyltin dilaurate or dibutyltin maleate, are preferred. Other organotins can be used.

D. Prodegradant Synergistic Composition

It has been discovered that the prodegradant of organotitanate or organozirconate adduct, i.e., the organopyrophosphato monomeric adduct, displays an unpredicted synergism in the compostability of vinyl acetate polymers. The remarkable compostability property exists over ranges of ratios of the essential components. The exact mechanism for the unexpected results and the compostability of vinyl acetate polymers with the prodegradant is not completely understood. Certainly there are theories which could be proposed, but regardless of theories, the beneficial results evident in the numerous examples of this invention which follow, in further view of this detailed description, speak for themselves. Applicant relies upon these empirical demonstrations of the principles of this invention to advance its merit.

With the prodegradant of this invention, it has been found that the total composition of prodegradant is useful over a range of about 1 to about 10 parts (phr) by weight based upon 100 parts by weight of the vinyl acetate polymer. The most useful range of total parts by weight of the organotin or zirconate in the total composition is on the order of about 5 to about 7 phr. Where copolymers of PVC/VAC are used as reported above, in the case of organotin compound, the most useful parts are on the order of about 2 to about 3 phr. Each of the components of the system can range from 1 to 10 phr. The ratios of the components is not considered to be critically limiting among the broader aspects of the invention.

E. Plasticizer

It has been found that the plasticized and unplasticized PVAc compositions are compostable with the prodegradant system of this invention, as reported in Example 13 of the above-identified patent application Ser. No. 11/747,481. However, when necessary or as desired, the vinyl acetate composition can be plasticized with aliphatic or aromatic esters, typically, di-octyl adipate (DOA), di-isononylester of cyclohexane dicarboxylic acid or di-isodecyl phthalate (DIDP). In its presently best mode, the aliphatic ester is used.

The principles of this invention and its operating parameters will be further understood with reference to the following detailed examples which serve to illustrate the types of specific prodegradants and their amounts as used in typical vinyl acetate polymer resin formulations and the compostabilities displayed by the prodegradant of this invention. These examples are considered to be exemplary of this invention and should not be considered as limiting, especially in view of applicant's broad disclosure of the principles of this invention.

The compostability of the PVAc compositions of the examples was determined by following ASTM D 5526-94 (reapproved 2002), Standard Test Method for Determining Anaerobic Biodegradation of Plastic Materials Under Accelerated Landfill Conditions. Using the standard test, a mixture was prepared comprising 60% by weight of sterilized dehydrated manure (to simulate processed household waste), at different percentages of distilled water (35% or 60%), and 10% fermenting inoculum from an active composter. Film samples of the compostable PVAc polymers were run in the Examples which follow. All experiments were run at 97° F. in a dark incubator.

Example 1

1.5 grams of Poval (Kuraray) LM-20, a partially hydrolyzed polyvinyl acetate, having a number average molecular weight (Mn) of about 20,000 were dissolved in 50 grams of ethanol. The solution was coated on release liner to form a two-mil film when dry. Two grams of the dried film were placed in 50 grams of landfill composition per ASTM D 5526 containing 35% water; two grams were also placed in 50 grams of landfill composition having 60% water content. After ninety days at 35% moisture, the film was intact with a weight gain of about 6%. After ninety days at 60% moisture, the film appeared softened, and had gained about 10% in weight. There was no evidence of microbial growth. The cast film was clear and accepted pencil and ballpoint. It adhered strongly to 3M #142 pressure-sensitive tape.

Example 2

Example 1 was repeated, except each sample contained 0.05 gram of Kenrich LICA 38J, identified above, added while the polymer was in ethanol solution, and five samples were run of each variation of moisture levels. After 30 days' landfill exposure, at both moisture levels of 35% or 60% water, the polymer of all samples with the microlandfills, vanished into the landfill.

Example 3

Example 2 was repeated with a 1:1 blend of ethylene vinyl acetate (ELVAX 40 EVA) and a partially hydrolyzed polyvinyl acetate (Polval LM-20 PVAc). Both moisture level samples vanished in 30 days. The cast film was clear and accepted pencil and ballpoint ink without difficulty. 3M #142 transparent tape had strong adhesion to the film. A sample exposed to UV-A light at 40° C. for 30 days showed no visible discoloration. The sample burned readily when ignited with a match, and did not self-extinguish.

Example 4

Example 1 was repeated with UCAR VYHH (Dow) PVC/VAC, which is a copolymer of polyvinyl chloride and vinyl acetate at 14% vinyl acetate, with a number average molecular weight (Mn) of about 10,000. Two films were cast from methylisobutylketone with two parts per hundred of dibutyltin dilaurate (DBTDL) heat stabilizer added. This Example demonstrates that when the vinyl copolymer of vinyl acetate with vinyl chloride is employed, stabilizer is added. The samples were translucent, accepted pencil and ballpoint ink, and had strong adhesion to 3M #142 tape. The samples showed no measurable weight loss after 90 days' exposure, either at a 35% or 60% moisture level, nor evidence of surface mold growth.

Example 5

Example 4 was run with the addition of 2 phr of LICA 38J at 35% water, weight loss after 30 and 60 days was 65% and 96%, respectively. At 60% water, weight loss after 30, 60, and 90 days was 12%, 20%, and 27%, respectively. This Example demonstrated, at various moisture levels, landfill compostability of the composition. This Example 5 may be compared to Example 13 in the earlier application Ser. No. 11/747,481, filed May 11, 2007, for the purpose of demonstrating unplasticized PVC/VAC polymer compositions. The VYHH PVC copolymer with 14% vinyl acetate was employed in that Example 13. As reported in that Example 13, the VYHH PVC/VAC copolymer with vinyl acetate does not itself decompose into the landfill, nor does this occur with 2-5 phr of K-38, which is the titanate component of the adduct. However, samples containing the prodegradant system of 5, 1, and 0.5 phr K38J adduct and 2 phr DBTL organotin depolymerization or compostability was observed upon performing the ASTMD 5526 conditions. Accordingly, when using the prodegradant system of K38J and organotin, after 60 days at 35° C. in the dark, no visual traces of the PVC/VAC copolymer were observed. These Examples 5 (in this application) and Example 13 of the patent application Ser. No. 11/747,481, demonstrate that unplasticized halogenated copolymers with vinyl acetate will effectively decompose with the prodegradant of this invention.

Example 6

Example 5 was run using the 1:1 of UCAR VYHH PVC/VAC and Poval LM-20 PVAc, identified as above. At both moisture levels of 65% and 96%, the polymer had vanished into the landfill in 30 days. The 2 ml cast film was transparent, readily accepted pencil and ballpoint marking, and adhered strongly to 3M #142 tape. The sample exposed to UV-A radiation at 40° C. for 30 days (Q-panel) showed no discoloration. The sample, when ignited with a match, self-extinguished.

Example 7

Example 5 was run using a blend of UCAR VYHH PVC/VAC and ELVAX-40, previously identified, at both 35 and 60 percent moisture levels, weight loss after 30 days was 45-50%, and 100% after sixty days. Accordingly, these Examples further illustrate the compostability of vinyl acetate copolymers according to the principles of this invention.

Having described this invention in its various embodiments and parameters, other variations will become apparent to a person of ordinary skill in the art without deviating from the scope of the described embodiments and the invention.

What is claimed is:

1. An anaerobically compostable vinyl acetate polymer composition comprising
   a vinyl acetate polymer and
   a monomeric adduct of an organotitanate or organozirconate as a prodegradant in relative amounts to render the vinyl acetate polymer composition anaerobically compostable under ASTM D-5526-94 conditions, wherein said adduct is defined by the formula:

organotitanate or zirconate —P=O(OH) salt-forming group-R—C=C-activating group, wherein R is a hydrocarbon radical or substituted hydrocarbon radical and the activating group has a C=O, —CN, oxygen, nitrogen, sulfur, or an aromatic ring conjugated with the C=C to activate the carbon-carbon double bond, wherein the substituent of the substituted hydrocarbon radical is selected from the group consisting of an ether, thioether, ester, thioester, and amide
   wherein the monomeric adduct is an adduct of a monomer selected from the group consisting of
   ethyl dimethylaminoethylmethacrylate,
   methyl dimethylaminopropyl acrylate,
   2-morpholine-N-ethyl acrylamide,
   2-piperidinyl-N-ethyl acrylonitrile,
   2-dimethylaminoethyl acrolein,
   dimethylaminoethyl vinyl ether,
   dimethylaminoethyl vinyl thioether,
   4-dimethylaminomethyl styrene,
   allyl 3-dimethylamino propionate,
   methallyl 3-dimethylamino propionate,
   thioallyl 3-dimethylamino propionate,
   dimethylaminomethyl acrylate, and
   dimethylaminomethylacrylamide.

2. The composition of claim 1 wherein the prodegradant is contained in an amount of from about 1 to about 10 phr of polymer.

3. A compostable vinyl acetate polymer composition comprising
   a vinyl acetate polymer and
   a monomeric adduct of an organotitanate or organozirconate as a prodegradant in relative amounts to render the vinyl acetate polymer composition compostable,
   wherein said organotitanate or organozirconate is an amide or ester adduct of neoalkoxy modified monoalkoxy titanate or zirconate.

4. A compostable vinyl acetate polymer composition comprising
   a vinyl acetate polymer and
   a monomeric adduct of an organotitanate or organozirconate as a prodegradant in relative amounts to render the vinyl acetate polymer composition compostable,
   wherein the monomeric adduct is selected from the group consisting of titanium IV neoalkanolato tri(dioctyl)pyrophosphato-O (adduct) N-substituted methacrylamide, titanium IV bis(dioctyl)pyrophosphato-O (adduct) N,N-dimethylamino-alkyl propenamide, zirconium IV neoalkanolato tri(dioctyl)pyrophosphate-O (adduct) N-substituted methacrylamide and zirconium IV bis(dioctyl)pyrophosphato-O (adduct) N,N-dimethylamino-alkyl propenamide.

5. The composition of claim 1 wherein the vinyl acetate polymer is selected from the group consisting of polyvinyl acetate, partially hydrolyzed polyvinyl acetate, poly(vinyl acetate-vinyl chloride) or poly(ethylene-vinyl acetate).

6. A compostable polyvinyl acetate (PVAc) polymer composition comprising
   polyvinyl acetate or a copolymer thereof and
   a monomeric adduct as a prodegradant selected from the group consisting of titanium IV neoalkanolato tri(dioctyl)pyrophosphato-O (adduct) N-substituted methacrylamide, zirconium IV neoalkanolato tri(dioctyl)pyrophosphato-O (adduct) N-substituted methacrylamide, titanium IV bis(dioctyl)pyrophosphato-O (adduct) N,N-dimethylamino-alkyl propenamide, and zirconium IV bis(dioctyl)pyrophosphato-O (adduct) N,N-dimethylamino-alkyl propenamide, said prodegradant in relative amounts to render the vinyl halide polymer composition compostable.

7. An anaerobically compostable vinyl acetate polymer article comprising
   an article containing a vinyl acetate polymer and
   a monomeric adduct of an organotitanate or organozirconate as a prodegradant in relative amounts to render the vinyl acetate polymer article compostable under ASTM 5526-94 conditions, wherein said adduct is defined by the formula:

organotitanate or zirconate —P═O(OH) salt-forming group-R—C═C-activating group, wherein R is a hydrocarbon radical or substituted hydrocarbon radical and the activating group has a C═O, —CN, oxygen, nitrogen, sulfur, or an aromatic ring conjugated with the C═C to activate the carbon-carbon double bond, wherein the substituent of the substituted hydrocarbon radical is selected from the group consisting of an ether, thioether, ester, thioester, and amide
      wherein the monomeric adduct is a prodegradant of a monomer selected from the group consisting of
      ethyl dimethylaminoethylmethacrylate,
      methyl dimethylaminopropyl acrylate,
      2-morpholine-N-ethyl acrylamide,
      2-piperidinyl-N-ethyl acrylonitrile,
      2-dimethylaminoethyl acrolein,
      dimethylaminoethyl vinyl ether,
      dimethylaminoethyl vinyl thioether,
      4-dimethylaminomethyl styrene,
      allyl 3-dimethylamino propionate,
      methallyl 3-dimethylamino propionate,
      thioallyl 3-dimethylamino propionate,
      dimethylaminomethyl acrylate, and
      dimethylaminomethylacrylamide.

8. A compostable vinyl acetate polymer article comprising
   an article containing a vinyl acetate polymer and
   a monomeric adduct of an organotitanate or organozirconate as a prodegradant in relative amounts to render the vinyl acetate polymer article compostable,
   wherein the monomeric adduct is selected from the group consisting of titanium IV neoalkanolato tri(dioctyl)pyrophosphato-O (adduct) N-substituted methacrylamide, titanium IV bis(dioctyl)pyrophosphato-O (adduct) N,N-dimethylamino-alkyl propenamide, zirconium IV neoalkanolato tri(dioctyl)pyrophosphate-O (adduct) N-substituted methacrylamide, and zirconium bis(dioctyl)pyrophosphato-O (adduct) N,N-dimethylamino-alkyl propenamide.

9. The compostable article of claim 7 wherein the vinyl acetate polymer is polyvinyl acetate or a copolymer thereof.

10. A composite comprising the article of claim 7 and a compostable woven or nonwoven fabric.

11. A compostable polyvinyl acetate (PVAc) article comprising
   an article containing a polyvinyl acetate or a copolymer thereof and
   a monomeric adduct as a prodegradant selected from the group consisting of titanium IV neoalkanolato tri(dioctyl)pyrophosphato-O (adduct) N-substituted methacrylamide, zirconium IV neoalkanolato tri(dioctyl)pyrophosphato-O (adduct) N-substituted methacrylamide, titanium IV bis(dioctyl)pyrophosphato-O (adduct) N,N-dimethylamino-alkyl propenamide, and zirconium IV bis(dioctyl)pyrophosphato-O (adduct) N,N-dimethylamino-alkyl propenamide, said prodegradant in relative amounts to render the polyvinyl acetate or copolymer compostable.

12. A composite article comprising a sheet of claim 11 and a compostable woven or nonwoven fabric.

13. The composite article of claim 12 wherein said woven or nonwoven fabric is a compostable fabric of a polymer selected from the group consisting of polyvinyl alcohol, polyacrylamide, polyacrylate, polymethacrylate and polyester.

14. A method of anaerobic biodegradation of a vinyl acetate polymer article in a landfill comprising
   introducing a vinyl acetate polymer article or a physically reduced form thereof into a landfill for anaerobic degradation, said article having a composition of
   a vinyl acetate polymer and
   a monomeric adduct of an organotitanate or organozirconate as a prodegradant in relative amounts to render the vinyl acetate polymer article compostable under ASTM D-5526-94 conditions, and wherein said adduct is defined by the formula:

organotitanate or zirconate —P═O(OH) salt-forming group-R—C═C-activating group, wherein R is a hydrocarbon radical or substituted hydrocarbon radical and the activating group has a C═O, —CN, oxygen, nitrogen, sulfur, or an aromatic ring conjugated with the C═C to activate the carbon-carbon double bond, wherein the substituent of the substituted hydrocarbon radical is selected from the group consisting of an ether, thioether, ester, thioester, and amide; and
      anaerobically biodegrading said article in the landfill.

15. The method of claim 14 wherein said adduct is an organopyrophosphato adduct of a monomer selected from the group consisting of methacrylamide, N-substituted methacrylamide, methacrylate and N-substituted methacrylate.

16. A method of anaerobic biodegradation of a vinyl acetate polymer article in a landfill comprising
   introducing a vinyl acetate polymer article or a physically reduced form thereof into a landfill for anaerobic degradation, said article having a composition of
   a vinyl acetate polymer and
   a monomeric adduct of an organotitanate or organozirconate as a prodegradant in relative amounts to render the vinyl acetate polymer article compostable wherein said vinyl acetate (PVAc) polymer article comprises
   polyvinyl acetate or a copolymer thereof and
   a monomeric adduct as a prodegradant selected from the group consisting of titanium IV neoalkanolato tri(dioctyl)pyrophosphato-O (adduct) N-substituted methacrylamide, zirconium IV neoalkanolato tri(dioctyl)pyrophosphato-O (adduct) N-substituted methacrylamide, titanium IV bis(dioctyl)pyrophosphato-O (adduct) N,N-dimethylamino-alkyl propenamide, and zirconium IV bis(dioctyl)pyrophosphato-O (adduct) N,N-dimethylamino-alkyl propenamide, said prodegradant in relative amounts to render the vinyl acetate polymer article compostable.

17. The method of claim 14 wherein the monomeric adduct is an adduct of a monomer selected from the group consisting of
   ethyl dimethylaminoethylmethacrylate,
   methyl dimethylaminopropyl acrylate,
   2-morpholine-N-ethyl acrylamide,
   2-piperidinyl-N-ethyl acrylonitrile,
   2-dimethylaminoethyl acrolein,
   dimethylaminoethyl vinyl ether, dimethylaminoethyl vinyl thioether,
4-dimethylaminomethyl styrene,
allyl 3-dimethylamino propionate,
methallyl 3-dimethylamino propionate,
thioallyl 3-dimethylamino propionate,
dimethylaminomethyl acrylate, and
dimethylaminomethylacrylamide.

* * * * *